United States Patent [19]

Bowman

[11] Patent Number: 5,008,491

[45] Date of Patent: Apr. 16, 1991

[54] FLOOR BOX FOR ACCESS FLOORS

[75] Inventor: Timothy S. Bowman, Parkersburg, W. Va.

[73] Assignee: Butler Manufacturing Company, Kansas City, Mo.

[21] Appl. No.: 322,104

[22] Filed: Mar. 13, 1989

Related U.S. Application Data

[63] Continuation-in-part of Ser. No. 95,437, Aug. 27, 1987, abandoned.

[51] Int. Cl.⁵ .............................................. H02G 3/18
[52] U.S. Cl. ................................................. 174/48
[58] Field of Search ............... 174/48, 49, 53; 52/220, 52/221, 263

[56] References Cited

U.S. PATENT DOCUMENTS

| | | | |
|---|---|---|---|
| 3,418,420 | 12/1968 | Zerwes | 174/53 |
| 3,895,178 | 7/1975 | Huibrechtse | 174/48 |
| 3,896,960 | 7/1975 | Schindler et al. | 174/48 X |
| 4,443,654 | 4/1984 | Flachbarth et al. | 174/48 |
| 4,536,612 | 8/1985 | Domigan | 174/48 |
| 4,591,656 | 5/1986 | Mohr | 174/48 |
| 4,721,476 | 1/1988 | Zeliff et al. | 174/48 X |

Primary Examiner—Leo P. Picard
Assistant Examiner—David A. Tone
Attorney, Agent, or Firm—McAndrews, Held & Malloy, Ltd.

[57] ABSTRACT

A box to be mounted in an opening in an access or raised floor. The top of the box has flanges which engage the floor and support the box in the floor opening. The width of the box is the same as the width of the opening in the floor. The length of the box is greater than the length of the opening. The box has a curved front so that it can be swung down into the opening and when in position part of the box is under the floor. The part of the box under the floor is provided with barriers which form high and low tension channels. The box has a cover providing access to the inside of the box. The inside of the box has a plurality of plates which support high tension receptacles and low tension jacks. Also, in one embodiment, the box has a pass-thru channel for passing and/or splicing cable.

28 Claims, 8 Drawing Sheets

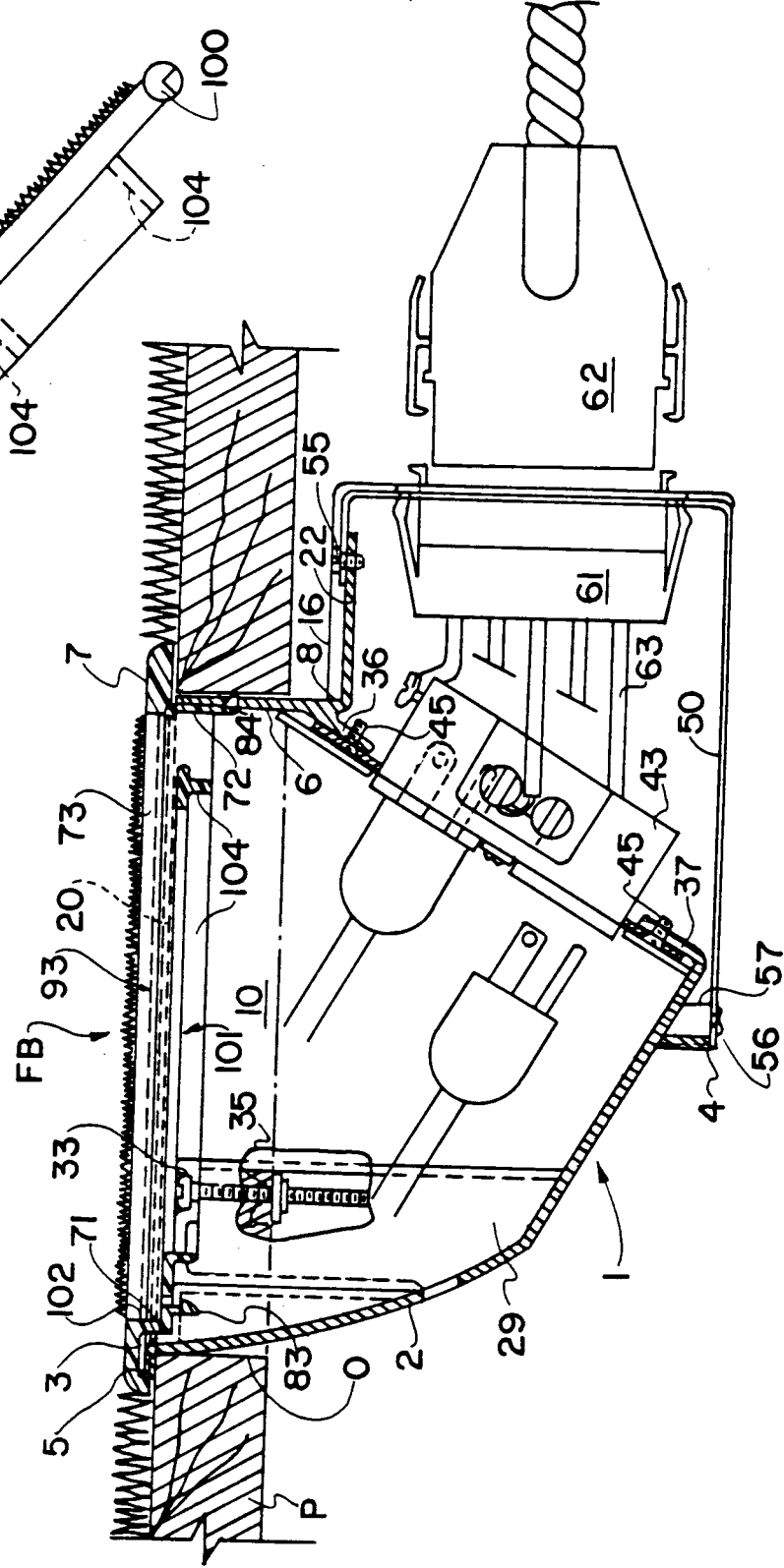

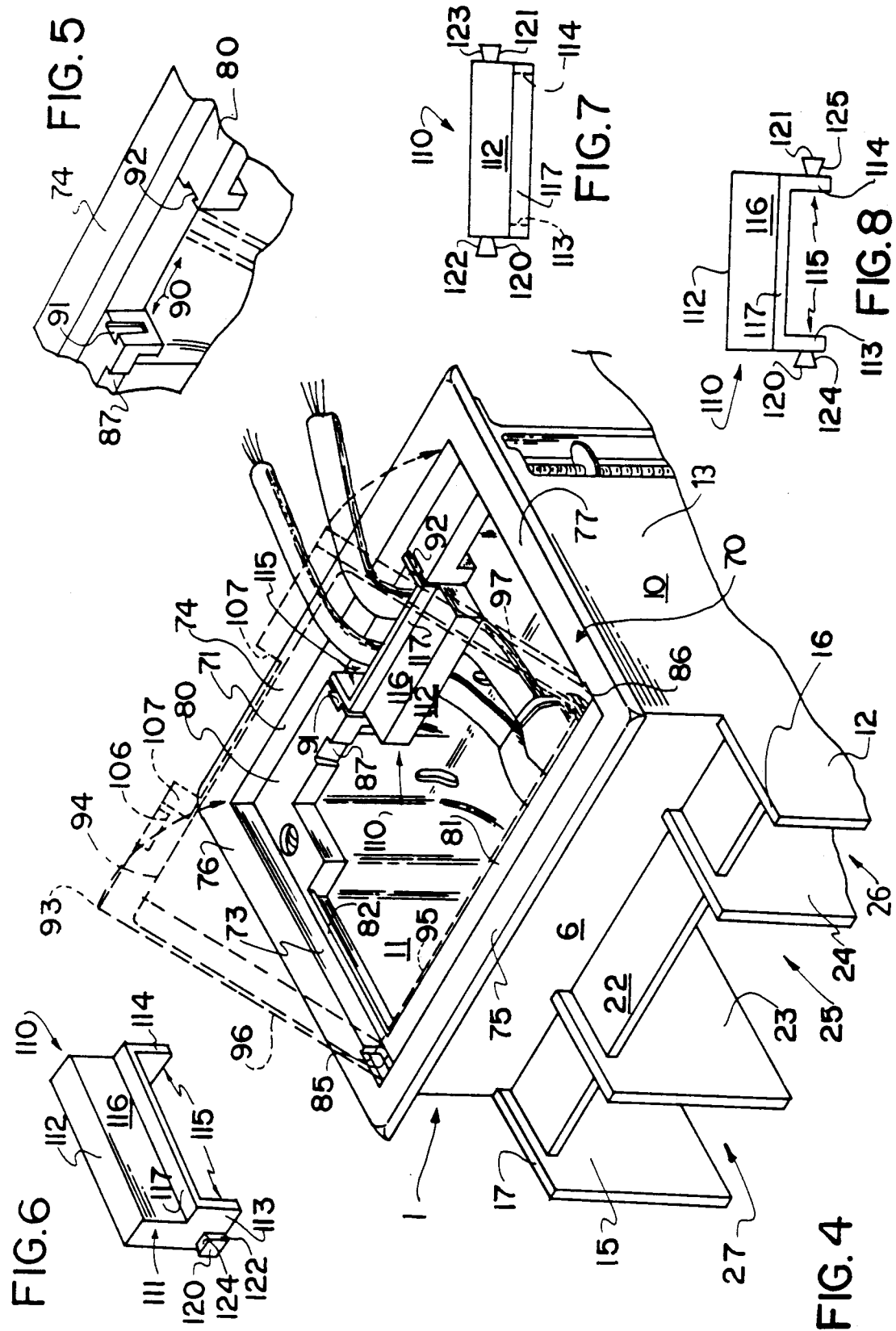

FLOOR BOX FOR ACCESS FLOORS

This application is a continuation-in-part of my application Ser. No. 95,437 filed Aug. 27, 1987, which was copending at the time of filing this application and is now abandoned.

BACKGROUND OF THE INVENTION

This invention relates to electrical distribution systems for buildings and in particular relates to an electrical distribution system used below a building floor commonly referred to as an access floor, a raised floor, a false floor, a computer room floor, and the like.

More specifically, the invention relates to a floor box to be mounted in a precut opening in a panel of an access floor to convey communications and data cables to a work station on the floor surface, and to provide recessed power receptacles to receive plugs from the work station.

At the present time there are, in general, two methods of installing access floor boxes.

In one method, the box is supplied in two parts, one part being the box housing and the other part being the cover. The floor panel is removed, an access hole cut in same, and the housing fastened to the underside of the panel in alignment with the opening. The panel is replaced and the cover installed. The advantage of this type of arrangement is that the sections holding the power receptacles and the communication/data cables can be off-set laterally from the panel opening and, thus, increase the inside work area. Moreover, the size of the access opening in the panel can be kept to a minimum and, thus, not impair the structural integrity of the frame. The disadvantage is that the panel must be removed for installation and there is the additional step of installing the cover. In the other method, the box housing has the same cross sectional area as the opening in the floor panel. The receptacles and communication/data cable entry means are located right under the opening in the floor panel. The disadvantage of this is that the inside work area is reduced. Another disadvantage is that the access hole must be large and the structural integrity of the floor panel is weakened. One advantage is that the floor panel opening can be cut without removing the panel and another advantage is that the box housing can be inserted into the opening with the cover in place.

The structure of the floor box of the present invention combines the principal advantage of both methods. The box housing and cover are assembled as a unit and inserted into a panel opening cut from the top. The access hole is of minimum size and has little if any effect on the structural integrity of the floor panel. The sections holding the power receptacles and communication/data entry means are laterally offset from the panel opening and this increases the inside work area.

The box cover has an opening for passing power, communication, and data cables. For closing off the opening when the floor box is not in use and for conditioning the opening to pass cables, the invention provides a wire retainer which can be mounted on the cover frame in one way to close off the opening and in another way to free the opening to pass cables.

The floor box has unique structures for accomplishing the foregoing and this will be apparent from the description below taken in connection with the following drawings wherein:

BRIEF DESCRIPTION OF THE DRAWINGS

FIG. 1 is a side elevational view partially in section illustrating the floor box as mounted in an access floor;

FIG. 2 is a side elevational view of the cover of the floor box of FIG. 1 in an open position;

FIG. 4 is a partial perspective view of the housing and cover frame showing the position of the wire retainer for permitting passage of cables.

FIG. 5 is a fragmentary view showing the opening in the cover frame for the passage of cables;

FIG. 6 is a perspective view of the wire retainer;

FIG. 7 is a plan view of the wire retainer shown in FIG. 6;

FIG. 8 is an elevational view of the wire retainer shown in FIG. 6;

DETAILED DESCRIPTION OF THE INVENTION

As depicted in FIG. 1, the panel of the access floor is indicated at P and an access opening O receives the floor box FB.

Figure 3:
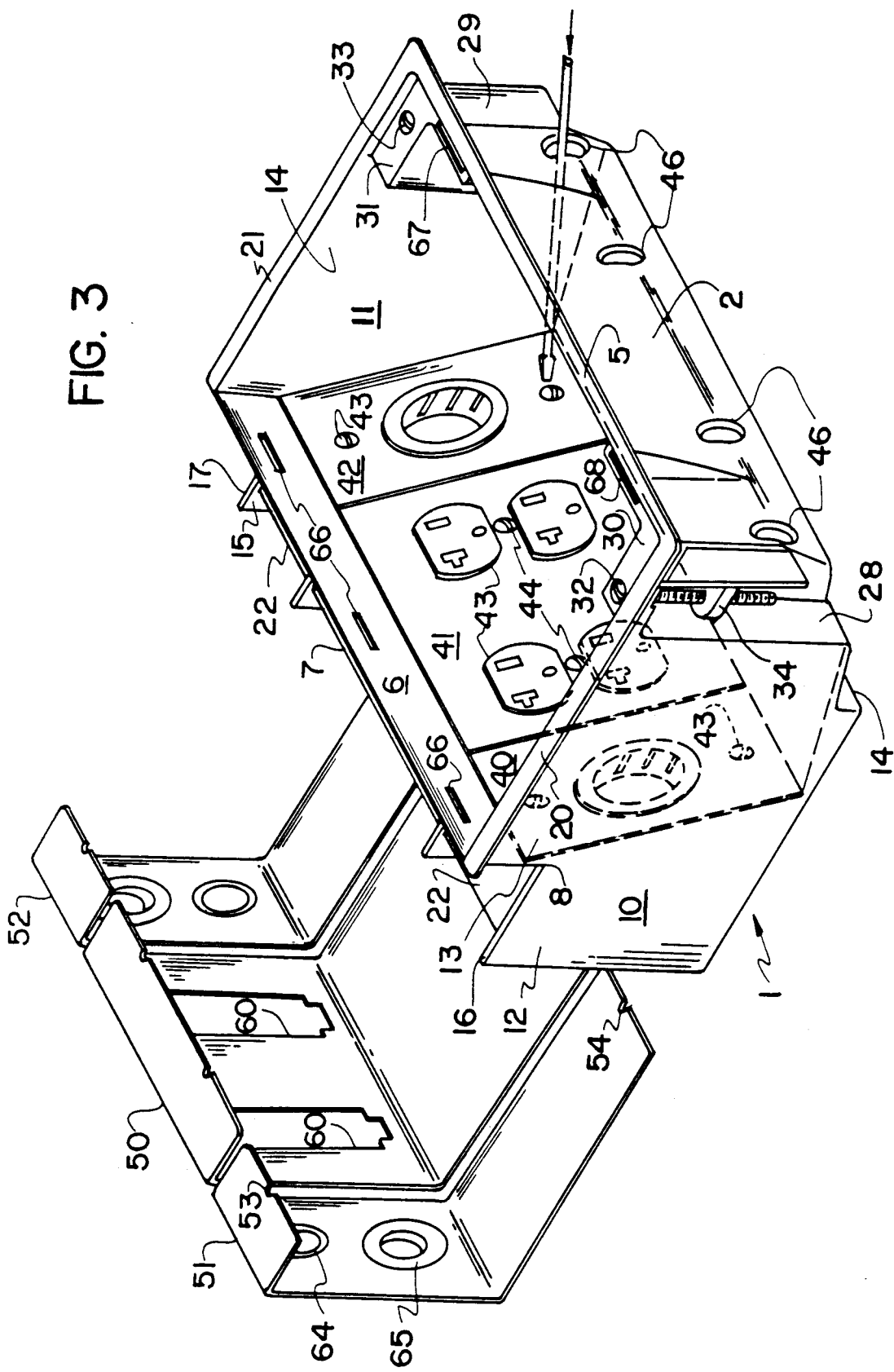
FIG. 3 is an exploded perspective view of housing components of the floor box of FIG. 1.

The floor box FB has the housing 1 and the structure of the housing will be explained with particular reference to FIGS. 1, 3, and 4. The housing 1 has a front wall 2 having a top edge 3 and a bottom edge 4. The top edge 3 has an outwardly extending flange 5. A flat back wall 6 has a top edge 7 and a bottom edge 8. The housing also has a pair of flat, parallel side walls 10 and 11.

Each of the side walls 10 and 11 have upper and lower sections. For example, the side wall 10 has lower section 12 and upper section 13. As noted, the lower section 12 extends outwardly from the bottom edge 8 of the back wall 6. The side wall 11 is similarly constructed having upper section 14 and lower section 15. The lower sections 12 and 15 have top edges 16 and 17.

The upper section 13 terminates in a top edge which has an outwardly extending flange 20 and the upper section 14 terminates in a top edge which has an outwardly extending flange 21. The flanges 5, 20, and 21 are coplanar. The purpose of these flanges is to engage the edges of the opening O and thereby mount the floor box FB on the access floor panel P as will be evident from FIG. 1.

A flat back foot 22 is connected to the bottom edge 8 of the back wall 6 and extends outwardly and is connected respectively adjacent but just below top edges 16 and 17 of the lower extensions of the side walls as best seen in FIG. 4.

It will be observed that the front wall 2 arcuately converges from the top edge 3 downwardly to the bottom edge 4. From the foregoing, it will be evident that the front 2, back 6, and side walls 10 and 11 form a generally rectangular shaped chamber with the respective top edges forming an opening bordered in part by the flanges 5, 20, and 21.

With particular reference to FIG. 4 and FIG. 1, it will be seen that a pair of spaced apart barriers 23 and 24 extend inwardly and are parallel to the side walls 10 and 11. On the top, the barriers are joined to the back foot 22 and extend inwardly to the bottom edge 8. On the bottom the barriers are coplanar with the bottom of the side walls 10 and 11 and extend inwardly and are joined with the bottom edge 4.

The space between the barrier 23 and 24 forms a power channel 25. The space between the side wall 10 and barrier 24 forms a communication and/or data channel 26 and the space between the barrier 23 and side wall 11 forms a communication and/or data channel 27.

At opposite ends of the front wall 2 are formed exterior pockets 28 and 29. The tops 30 and 31 of the pockets lie within the chamber and have clearance holes to receive locking tab screws 32 and 33. These screws extend down into the pockets 28 and 29 and have locking tabs 34 and 35. The purpose of the locking tabs is to fit up under the panel P (FIG. 1) and secure the housing in position. Referring to FIG. 1, it will be seen that a top support 36 is positioned adjacent the bottom edge 8 of the back wall 6 and is coextensive with the bottom edge 8. A bottom support 37 is positioned adjacent the bottom edge 4 of the front wall 2 and is coextensive with the bottom edge 4.

The supports 36 and 37 mount the electrical plates 40 and 42. The plates 40 and 42 are communication/data plates and are secured by screws 43 threaded into the top support 36 and lower support 37. The plate 41 is a receptacle cover plate which is secured to receptacles 43 by screws 44, the tabs of the receptacles being connected to the top and lower supports 36 and 37 by screws 45.

It will be noted that the plates 40, 41, and 42 are oriented at an angle so that direct contact with the screws through the opening in the chamber is difficult. Thus, I have provided apertures 46 in front wall 2. The shank of a screw driver (see FIG. 3) can be inserted through these apertures so the head can contact the screws.

The power channel 25 is provided with a cover 50 and the communication/data channels 26 and 27 are provided with covers 51 and 52. The covers 51 and 52 are extensions of the back wall 6. The top edge and the bottom edge of each cover has half moon clearance holes such as the holes 53 and 54 for the cover 51. These half moon holes receive screws (FIG. 1) such as the screws 55 threaded in the back foot 22 and the screw 56 threaded into the boss 57 adjacent the bottom edge 4 of the front wall. There are two additional bosses like the boss 57 for the screws for covers 51 and 52. The cover 50 for the power channel has openings 60 which receive wire connectors such as the wire connector 61. These wire connectors or receptacles are of the type shown in copending application of R.D. Benscoter et al Ser. No. 480,470 now U.S. Pat. No. 4,857,016. The wire connector is adapted to receive a cable head 62 also of the type shown in application Ser. No. 480,470 now U.S. Pat. No. 4,857,016. The receptacle 43 is electrically connected to the wire connector 61 by conductors 63.

The communication/data covers 51 and 52 have knockouts to receive grommets for passing the communication/data cables. For example, see knockout 64 and grommet 65 for cover 51.

The floor box cover and frame assembly will now be described, but first I will refer to means in the housing 1 to secure the assembly in place. Back wall 6 has a plurality of slots 66 which are respectively adapted to receive a keeper finger. The tops of pockets 28 and 29 are formed with slots 67 and 68 which receive headed snap fingers. The heads engage the underside of the tops 30 and 31.

The cover frame is indicated at 70 and is rectangular in shape so as to fit into the opening to the housing. The frame has a front wall 71, rear wall 72, and side walls one of which is shown at 73. The tops of the foregoing side walls are coplanar and form a frame top and extending outwardly therefrom are flanges indicated at 74, 75, 76, and 77 which are also coplanar. On the lower part of each of the side walls is an inwardly extending cover support flange, the front and rear cover support flanges being indicated at 80 and 81 and the cover support flange on side wall 73 being indicated at 82. The side walls and support flanges form a recessed area to receive a cover as noted later.

On the underside of front support flange 80 there are a pair of snap latches one of which is indicated at 83 in FIG. 1. These snap latches are received in the slots 67 and 68 in the housing with each head of the latch engaging the underside of the tops 30 and 31.

The bottom of the rear wall 72 of the frame 70 has three horizontally extending fingers such as the finger 84 shown in FIG. 1. The fingers are received in slots 66 in the back wall 6.

It will be evident that with the rear fingers 84 in the slots 66 and the front latches (83) engaged with the housing, the cover frame 70 is held in position. It also will be apparent that with the foregoing arrangement, the cover frame can be quickly connected to the housing.

The side walls of the cover frame adjacent the rear wall 72 are formed with U-shaped pivot carriers 85 and 86. The pivot carriers are arranged to receive pivot shafts on the cover as will be commented on later. Additionally, the front flange 80 is formed with a slot 87 to provide room for a latch finger on the cover to move into position as will be noted later. The front flange 80 is formed with an opening 90 (FIG. 5). At each end of the opening 90 is a vertically extending dovetail keyway as indicated at 91 and 92. These keyways face one another and are parallel. As noted for the keyway 91, the keyway is closed at the bottom and open at top. These keyways are adapted to receive keys in a wire retainer which will be explained shortly.

The cover or cover frame 93 is rectangular in shape and includes four side walls, the front and back being indicated at 94 and 95 and the walls interconnecting same are indicated at 96 and 97. The top peripheral edges of the four side walls are coplanar and form a top cover edge 98. The opposite ends of the back wall 95 carry short pivot shafts which are adapted to fit into pivot carriers 85 and 86 in the cover frame 70. One of the pivot shafts is indicated at 100 in FIG. 2. The pivot shafts being rotatably mounted in the pivot carriers permit the cover to rotate between the closed position of FIG. 1 to any of the open positions as indicated in FIG. 2.

The pivot carriers and the pivot shafts are dimensioned so that the shafts can be snapped in and pulled out. The pivot carriers have a lower 180° curvature which corresponds to the diameter of the pivot shaft and at the extreme ends of the carrier instead of terminating the material, the same is slightly continued in the circle so that the space is slightly less than the diameter of the pivot shaft. When a shaft is pressed into a carrier, the same separates and allows the shaft to move fully into position. When the cover is to be pulled out, the carriers expand and permit exit of the pivot shafts. The cover or cover frame 93 includes central support section 101 which is joined to the bottoms of the front, back, and side walls and extends downwardly therefrom and is spaced inwardly from the top peripheral edges of the walls to form a carpet cavity 102 which carries carpet 103. The central support section 101 is formed as by a plurality of downwardly extending interconnected flanges 104 which create a strengthening grid.

The front side 94 of the cover has a finger 105 which when the cover is moved to the closed position is cammed inwardly by the slot 87 and when the finger passes the slot it snaps under the flange 80 of the frame to lock the cover in position. A pry-up slot 106 on the cover can receive the end of a screw driver by which the cover can be pryed loose.

The cover frame 70 and the cover 93 individually and in combination provide support means for foot, equipment, or wheeled traffic.

The front wall 94 of the cover also is formed with an opening 107 which, when the cover is in the closed position, is in vertical alignment with the opening 90 in the cover frame. The opening 107 can be put in an open or a closed condition by the action of a wire retainer as will now be explained. The shape of the wire retainer is shown in FIGS. 6, 7, and 8.

The wire retainer 110 has an elongated body 111 with a continuous planar top surface 112, a pair of side sections 113 and 114 extend outwardly of the body 111 and form a space 115 therebetween. This space 115 has approximately the same cross sectional area as the opening 90 in the frame and the opening 107 in the cover. The body has wide platform section 116 normal to the top 112 and a narrow platform section 117 normal to the platform section 116. The platform section 117 is also joined to the side sections 113 and 114.

The side sections 113 and 114 carry heads 120 and 121. Each head is configured so that in a direction normal to the top 112 (FIG. 7) the blocking dovetail keys 122 and 123 are formed. In the direction normal to the platform section 116 (FIG. 8) the opening dovetail keys 124 and 125 are formed. As will be apparent, the blocking keys 122 and 123 are at 90° to the opening keys 124 and 125.

If the wire retainer 110 as shown in FIG. 6 is placed over the opening 90 in the frame, and then rotated (into the paper) 90° about the axis of the body, and then is rotated in azimuth 180°, the head 121 will be over the keyway 91 and the head 120 will be over the keyway 92. The opening keys 123 and 122 will be ready to slide respectively in keyway 92 and keyway 91. If the wire retainer 110 is then moved down so the keys slide in the keyways, the retainers will be in the position as shown in FIG. 4. The wide platform 116 is in a position to be engaged with the cover. The opening 115 will be aligned with the opening 107 in the cover. This allows the passage of cables as shown.

Figure 9:
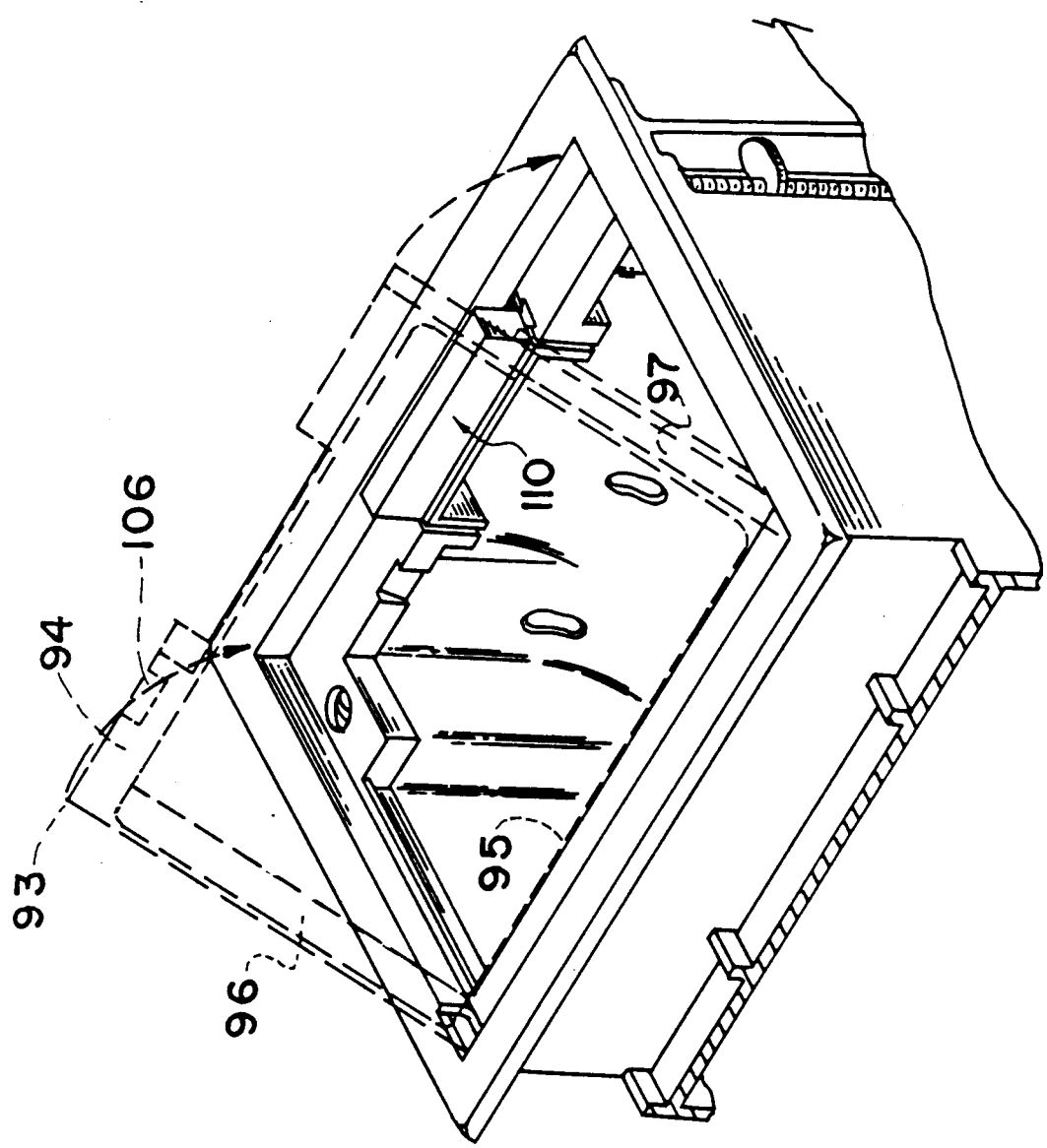
FIG. 9 is a view like in FIG. 4 illustrating the position of the wire retainer to block off the cable passage.

When the floor lap is not in use and the opening 107 in the cover is to be blocked off, the wire retainer 110 is removed from the opening and manipulated so that it assumes the position of FIG. 6 and moved over the opening 90 in the frame. The head 120 will be over the keyway 91 and the head 121 will be over the keyway 92 with the blocking keys 122 and 123 ready to slide in the keyways. If the wire retainer 110 is then moved down so the keys slide in the keyways, the wire retainer 110 will have assumed the position shown in FIG. 9. It will be seen that the opening 90 in the cover frame is closed and the opening 107 in the cover is also closed. The top 112 is flush with the front flange 74 of the frame and with the front peripheral edge of the cover.

The manner of installing the floor box in the access floor will now be described.

One of the advantages of the floor box is that it can be assembled above the floor with the cover, power wiring, and necessary communication/data grommets in place so that the access hole in the floor panel can be cut from the top. The power conductor with cable heads are brought out through the opening and plugged into the receptacles in the box. Likewise, the communication/data cables are brought out and threaded through the grommets in the floor box and then brought out through the open cover.

Figure 10:
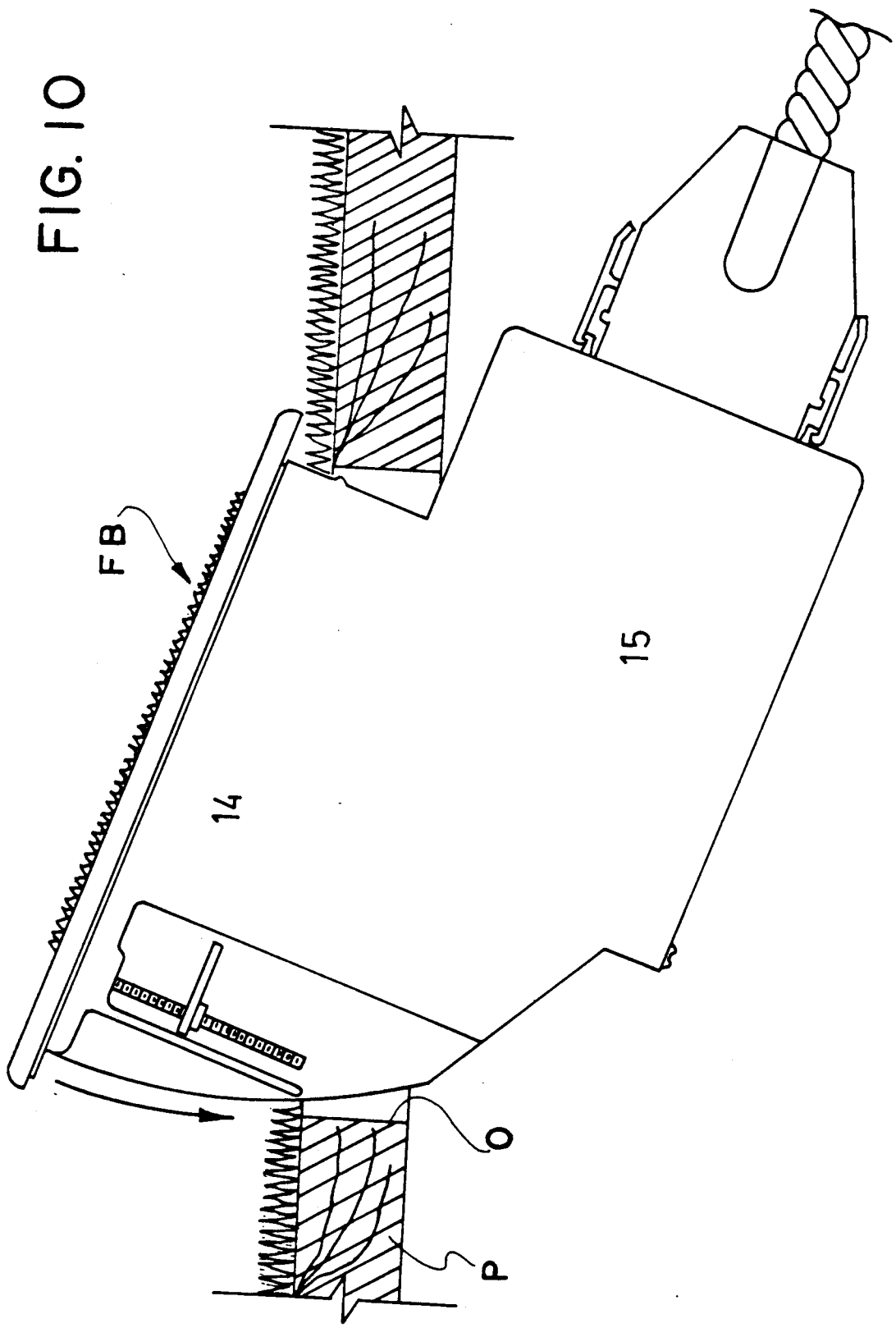
FIG. 10 is a side elevation to illustrate how the floor box is inserted in the opening in a floor panel.

The floor box is tilted with the back side down and slipped into the opening O. (See FIG. 10) As the box is moved inwardly, it is rotated so the rear section fits underneath the floor panel. The cables are pushed inwardly as the box is moved. The arcuate arrangement of the front wall 2 permits this motion. When the box is fully in position, the flanges will engage the panel and then the screws 32 and 33 can be turned to bring the locking tabs 34 and 35 against the underside of the panel and lock the box in position. The cables from the work station are brought into the box and plugged into the receptacles. The communication/data cables for the work station are also set up. All of the cables are then placed in the frame opening 90 and the wire retainer 110 dropped into the keyways in the position shown in FIG. 4. The cables are now held in position. The cover is closed and the operation is completed.

In FIGS. 11-20 I have shown the previously described floor box modified in a way to gain important advantages.

One important advantage is the increase in capacity of the box particularly with respect to the mix of power and telephone and data access facilities in the box.

The wire retainer or management block has special utility in the box because the nature of the block is conducive to handling the increased number of cables without difficulty.

Another advantage is that the modified box employs a pass-thru channel which permits cable to pass through the channel or to be spliced. For example, a 24 pair telephone cable may be spliced with 4 pair entering the box and the remainder passing through the box to another station. The housing 120a has a front wall 121a having a top edge 122a and a bottom edge 123a. The top edge 122a has an outwardly extending flange 124a. A flat back wall 125a has a top edge 126 and a bottom edge 127. The housing also has a pair of flat, parallel side walls 130 and 131.

It will be observed that the front wall is comprised of a top portion 132 and a lower portion 133. The top portion 132 terminates at the top edge 122a and the lower portion 133 terminates at the bottom edge 123a. The top portion 132 arcuately converges from the top edge 122a in a direction toward the bottom edge 123a. The lower portion 133 has a special configuration as will be presently described. The upper portion 132 and lower portion 133 join at 134.

The side walls 130 and 131 have upper and lower sections. The side wall 130 has lower section 135 and upper section 136. The side wall 131 is similarly constructed having (FIG. 14) upper section 140 and lower section 141. As noted, the lower sections 135 and 141 extend outwardly from the bottom edge 127 of the back wall 125a and include top edges 142 and 143.

The upper section 136 of side wall 130 has an outwardly extending flange 144 and the upper section 140 of side wall 131 has an outwardly extending flange 145. The flanges 123a, 144, and 145 are coplanar. The purpose of these flanges is to engage the edges of the opening and thereby mount the floor box on the access floor panel similar to the floor box previously described. A flat back foot 146 is connected to the bottom edge 127 of the back wall 125a and extends outwardly just below top edges 142 and 143.

From the foregoing, it will be evident that the front 121a, back 125a, and side walls 130 and 131 form a generally rectangular-shaped chamber with the respective top edges forming an opening bordered in part by the flanges 124a, 144, and 145.

A pair of spaced apart barriers 150 and 151 are parallel to the side walls 130 and 131. On the top, the barriers are joined to the back foot 146 and extend inwardly to the bottom edge 123a.

The space between the barriers 150 and 151 forms a power channel 152. The space between the side wall 130 and barrier 151 forms a communication and/or data channel 153 and the space between the barrier 150 and side wall 131 forms a communication and/or data channel 154.

Figure 11:
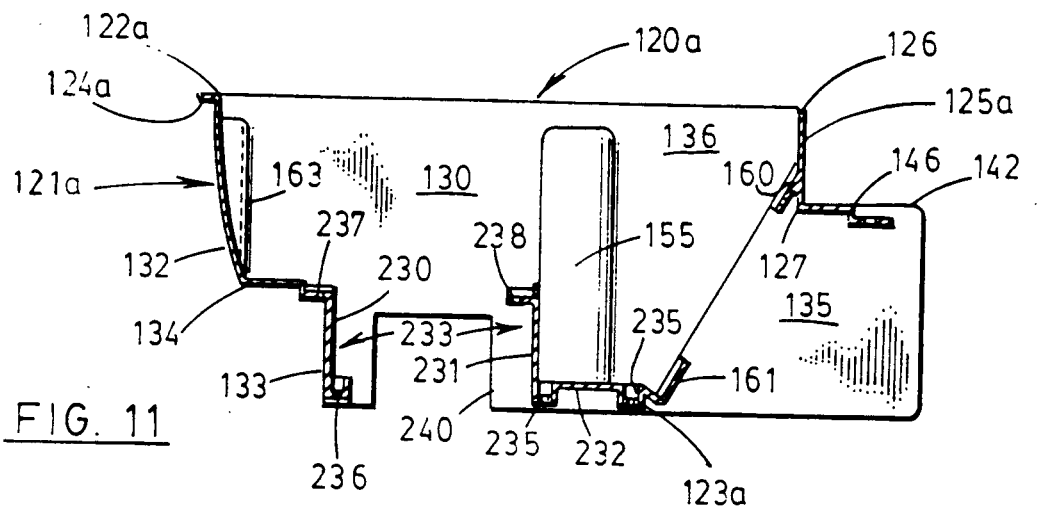
FIG. 11 is a side elevational view partially in section illustrating a modified housing for a floor box.
Figure 12:
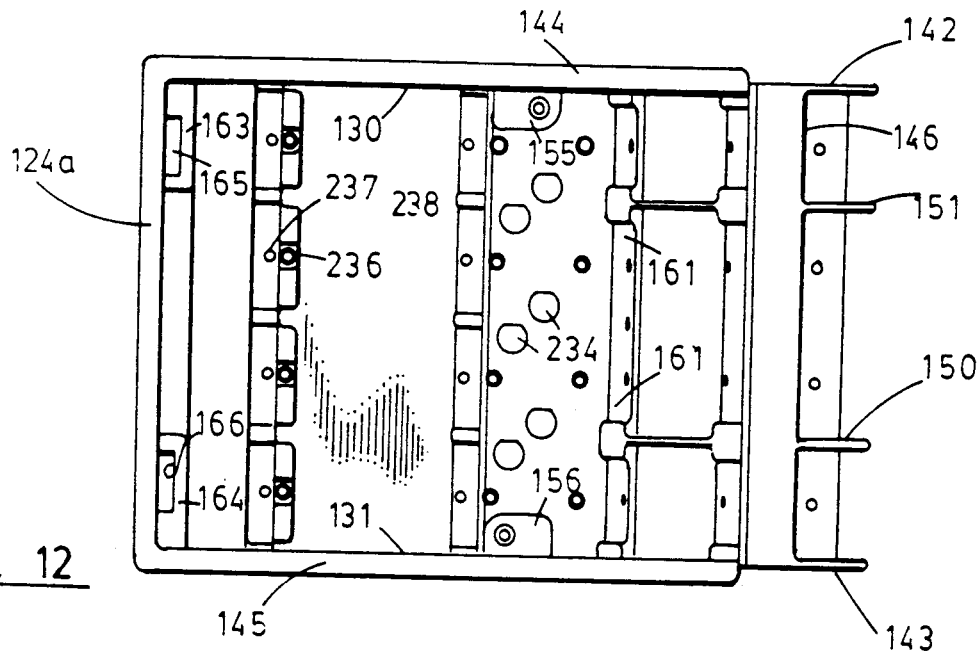
FIG. 12 is a plan view of the housing of FIG. 11.
Figure 13:
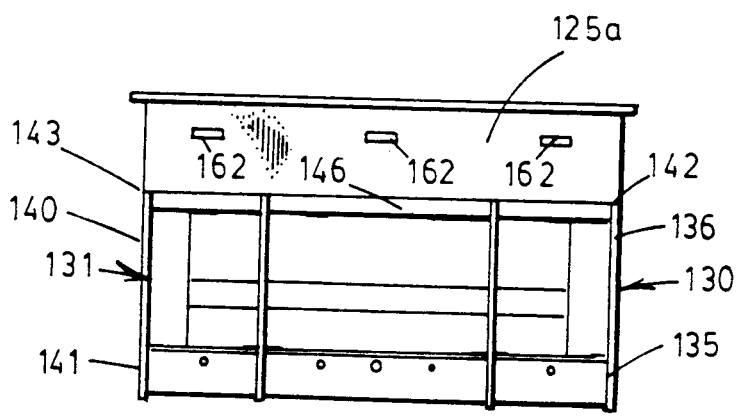
FIG. 13 is an elevational view looking toward the left in FIG. 11.
Figure 14:
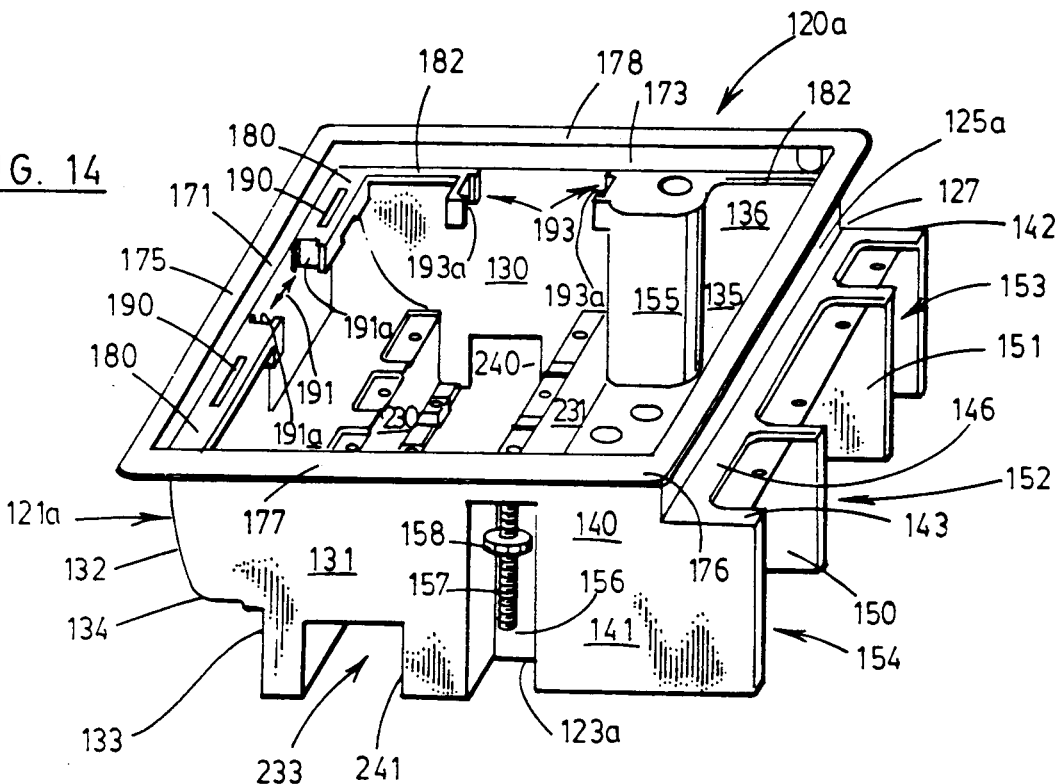
FIG. 14 is a perspective view of the housing of FIG. 11 with the cover frame of FIG. 15 in place.

Exterior pockets 155 and 156 are respectively formed on said walls 130 and 131. The tops of the pockets 155 and 156 lie within the chamber and have clearance holes to receive locking tab screws such as screw 157 of pocket 156. The screw 157 carries locking tab 158. The locking tabs serve the same purposes as tabs 34 and 35. Referring to FIGS. 11 and 12, it will be seen that a top support means 160 is positioned adjacent the bottom edge 127 of the back wall 125a and extends between side walls 130 and 131. A bottom support means 161 is positioned adjacent the bottom edge 123a of the front wall 121a and also extends between side walls 130 and 131. The supports 160 and 161 have means to mount the electrical plates which, like the plates 40, 41, and 42, are set up for power, communication, and data.

The power channel 152 and the communication/data channels 153 and 154 are provided with covers (similar to 51 and 52) to receive wire connectors and grommets. Like the covers 51 and 52, the cover for channels 152-154 when in place form part of the back wall of the floor box.

The floor box cover and frame assembly will now be described, but first I will refer to means in the housing 120a to secure the assembly in place. Back wall 125a has a plurality of finger keeper slots 162 which are respectively adapted to receive a keeper finger. The top portion 132 of front wall 121a has a pair of pockets 163 and 164, the tops of which are formed with latch finger slots 165 and 166 which respectively receive headed snap fingers with the heads engaging the underside of the tops of the pockets.

Figure 15:
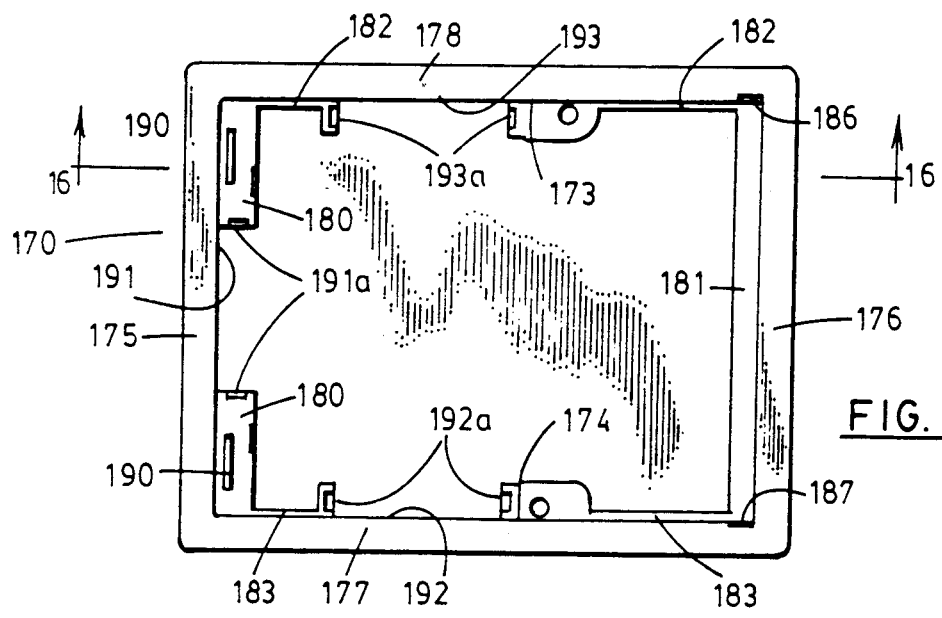
FIG. 15 is a plan view of a cover frame employed with the box of FIG. 11.
Figure 16:
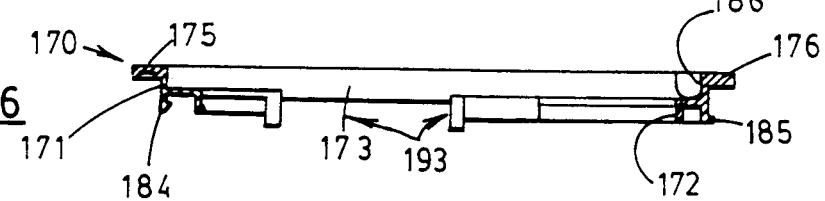
FIG. 16 is an elevational view taken along the lines 16—16 in FIG. 15.

Referring to FIGS. 15 and 16, the cover frame is indicated at 170 and is rectangular in shape so as to fit into the opening to the housing 120a. The frame has a front wall 171, rear wall 172, and side walls 173 and 174. On the tops of the foregoing frame walls are outwardly extending flanges indicated at 175, 176, 177, and 178 which are coplanar. On the lower part of each of the frame walls is an inwardly extending cover support flange, the front and rear cover support flanges being indicated at 180 and 181 and the cover support flange on side walls being indicated at 182 and 183. The frame walls and support flanges form a recessed area to receive a lid or cover as noted later.

On the underside of front support flange 180 there are a pair of snap latches one of which is indicated at 184 in FIG. 16. These snap latches are received in the slots 165 and 166 in the housing.

The bottom of the rear wall 172 of the frame carries three horizontally extending fingers such as the finger 185 shown in FIG. 16. The fingers are received in slots 162 in the back wall 125.

It will be evident that with the fingers 185 in the slots 162 and the front latches 184 engaged with the housing, the cover frame is held in position. It also will be apparent that with the foregoing arrangement, the cover frame can be quickly connected to the housing. The side walls 173 and 174 of the cover frame in position adjacent the rear wall 172 are formed with U-shaped pivot carriers 186 and 187. The pivot carriers are arranged to receive pivot shafts on the cover as will be commented on later. Additionally, the front flange 180 is formed with slots 190 to provide room for a latch finger on the cover to move into a cover locking position as will be noted later.

The embodiment of the box in FIGS. 11-20 has means for securing wire retainers or wire management blocks both on the front and on the sides. This will now be described.

The front flange 180 is formed with an opening 191. At each end of the opening 191 is a vertically extending dovetail keyway as indicated at 191a. The keyways face one another and are parallel. Each keyway is closed at the bottom and open at the top. The support flanges 182 and 183 have similar openings and keyways 192/192a and 193/193a.

Figure 17:
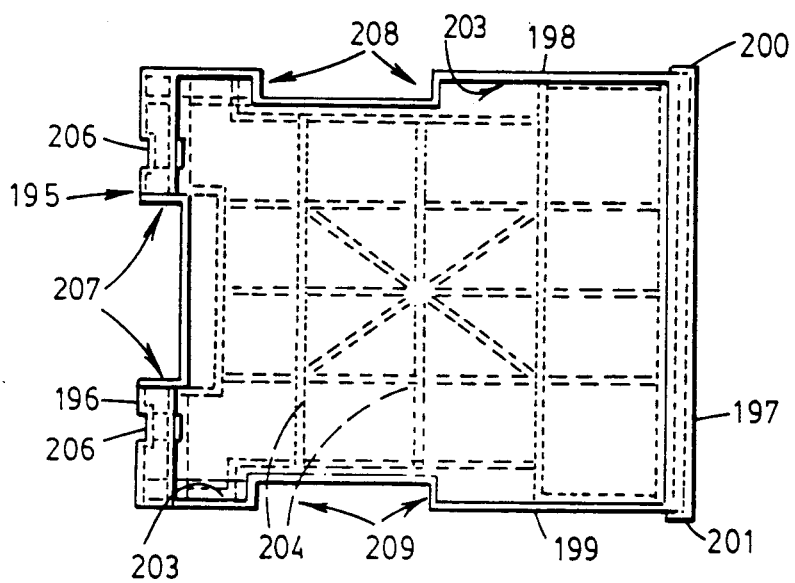
FIG. 17 is a plan view of a lid or cover employed with the frame of FIG. 15 when the box is installed in a floor with carpeted floor covering.
Figure 18:
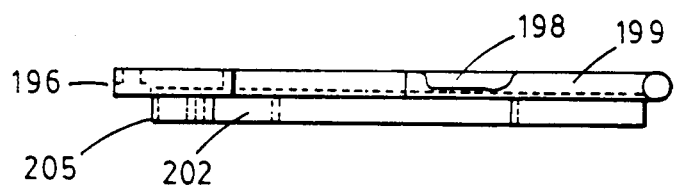
FIG. 18 is a side elevational view of the lid or cover of FIG. 17.

In FIGS. 17 and 18 I have shown a cover to be mounted in frame 170 and which is adapted for use on a floor with carpeting.

The cover 195 is rectangular in shape and includes four side walls, the front and rear being indicated at 196 and 197 and the walls interconnecting same are indicated at 198 and 199. The top peripheral edges of the four side walls are coplanar. The opposite ends of the rear wall 197 carry short pivot shafts 200 and 201 which are adapted to fit into pivot carriers 186 and 187 in the cover frame 170. The pivot shafts being rotatably mounted in the pivot carriers permit the cover to rotate between the closed and open positions.

Similar to the pivot carriers and the pivot shafts previously described, the carriers 186-187 and shafts 200-201 are dimensioned so that the shafts can be snapped in and pulled out.

The cover 195 includes central support section 202 which is joined to the bottoms of the front, back, and side walls and extends downwardly therefrom and is spaced inwardly from the top peripheral edges of the walls to form a cavity 203 for carpet. The central support section 202 is formed as by a plurality of downwardly extending interconnected flanges 204 which create a strengthening grid.

The front side 196 of the cover has a pair of latch fingers one of which is indicated at 205. When the cover is moved to the closed position, the fingers are cammed into slots 190 and snap under the flange 180. Pry-up slots 206 on the cover can receive the end of a screw driver by which the cover can be pryed loose.

The front wall 196 and the side walls 198 and 199 of the cover also are formed with openings 207, 208, and 209 which match openings in the cover frame for receiving part of the wire retainers or wire management blocks. Typical structure and the operation and function of the wire retainers or wire management blocks have been previously described and the same will not be repeated here.

Figure 19:
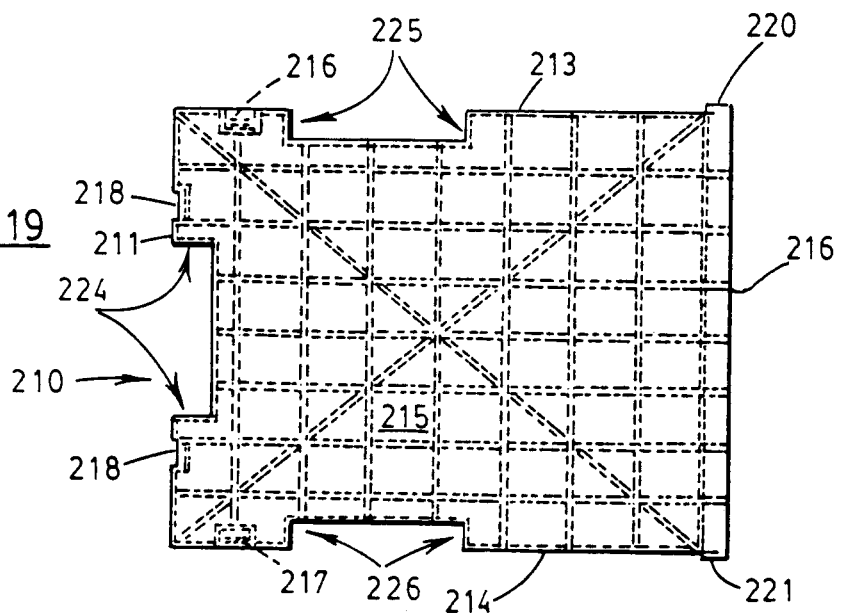
FIG. 19 is a plan view of a lid or cover employed with the cover frame of FIG. 15 when the box is installed in a floor with tile floor covering.
Figure 20:
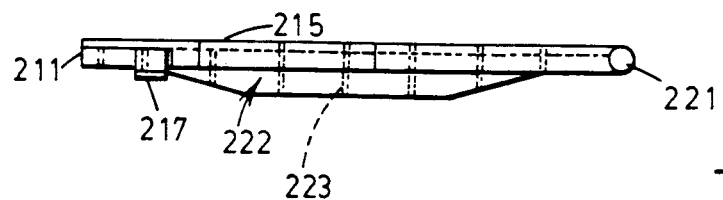
FIg. 20 is a side elevational view of the lid or cover of FIG. 19.

In FIGS. 19 and 20 I have illustrated a cover or lid for use with the cover frame 170 of FIGS. 15 and 16 and which is adapted for use on a floor have a tile covering.

The cover 210 is rectangular in shape and has front wall 211, rear wall 212, and side walls 213 and 214. A flat top plate 215 extends between the walls. When the cover is mounted in the frame 170, the surface of the plate 215 is flush with flanges 175-178. The side walls 213 and 214 carry snap fingers 216 and 217 which, when the cover is in closed position, snap under the flanges 182 and 183. The front wall has pry-up slots 218. Pivot shafts 220 and 221 are disposed at the opposite ends of rear wall 212. The central support section 222 extends down from plate 215 and comprises a plurality of vertical flanges 223. The front and side walls are provided with openings 224, 225, and 226 for receiving wire retainers or wire management blocks.

Referring back to FIGS. 11 and 12, the lower section 133 of the box will be described. The lower section 133 includes a front plate 230, a back plate 231, and a mounting plate 232. The plates 230 and 231 extend between side walls 130 and 131 and are spaced apart to form a channel 233 open at the top to the chamber and open at the bottom to the exterior of the box.

As noted, mounting plate 232 extends between the bottom edge 123 and the back plate 231 and carries a plurality of knockouts 234 for connecting such connectors for coax cable. The mounting plate 232 has clearance and/or threaded holes 235 for connecting one or more electrical plates. The front plate 230 also has clearance and/or threaded holes 236 for securing (in cooperation with holes 235) electrical plates and/or one or more covers.

The top of the plates 230 and 231 have threaded holes 237 and 238 for mounting electrical plates for either high or low tension connectors. When power receptacles are employed, a plate, for isolation purposes, has legs or barriers which extend down into the chamber to engage a plate.

The side walls 130 and 131 are cut away at opposite ends of the channel. The cutaway in wall 130 is noted at 240 and the cutaway in side wall 131 is indicated at 241. The channel permits a cable to pass through the box or to be spliced with a connector in the channel.

Before closing it is to be mentioned that the box of FIGS. 14-20 is installed in the opening in an access floor in the same way as previously described for the box of FIGS. 1-10.

I claim:

1. In an access floor box:
   a back wall having a top edge and a bottom edge;
   a front wall having a top edge and a bottom edge the front wall arcuately extending from its top edge in a direction toward its bottom edge;
   a pair of side walls each having an upper section having a top edge and a lower section, the upper sections being connected to said front and back walls and each lower section extending outwardly from the bottom edge of the back wall;
   flange means adjacent the top edges of the front, back, and side walls and respectively extending outwardly of the walls;
   a back foot connected to the bottom edge of the back wall and extending outwardly therefrom and connected to the respective top edges of the lower sections of the side walls which extend outwardly from the back wall;
   said front, back, and side walls forming a generally rectangular-shaped chamber with the respective top edges forming a rectangular-shaped opening to the chamber; and
   barrier means extending parallel said side walls and connected to said back foot and to the bottom edge of said front wall, the barrier means forming a plurality of channels for the passage of cable.

2. The floor box of claim 1 wherein each said side wall is formed with an exterior pocket, the top of the pocket being in said chamber and having a clearance hole for receiving a locking tab screw.

3. The floor box of claim 1 further including top support means adjacent the bottom edge of said back wall and bottom support means adjacent the bottom edge of said front wall for use in supporting electrical plate means within said chamber.

4. The access box of claim 1 wherein said back wall includes cover plate means extending between and connected to said back foot and to the bottom edge of said front wall and closing off said channels, the cover plate means having means to permit electrical cables to enter said channels.

5. The access floor box of claim 1 further including on the inside of said front wall means forming a plurality of front-wall latch keeper means, each for use in receiving a snap latch on a cover frame and further including means adjacent the top of said back wall forming a plurality of finger keeper means each for receiving a locking finger on a cover frame.

6. The access floor box of claim 5 further including on the inside of each of said side walls means forming a side wall keeper latch means, each for use in receiving a snap latch on a cover frame.

7. In the access floor box of claim 6:
   a rectangular-shaped cover frame in said rectangular-shaped opening, the cover frame formed with:
   a frame front wall, a frame back wall, and frame side walls forming an access opening to said chamber and the top of each last said wall being formed with said outwardly extending flange means;
   snap latch means connected respectively with each frame side wall for engaging said side wall latch keeper means;

locking finger means on said frame back wall for engaging said finger keeper means; and at the end of each side wall adjacent the back wall a U-shaped pivot shaft carrier, each for receiving a pivot shaft to rotatably mount a cover on the frame.

8. The access box of claim 7 further including:

means on said cover frame adjacent said front wall forming a pair of spaced apart, facing keyways open at the top and closed at the bottom and means on said cover frame respectively adjacent said side walls each forming a pair of spaced apart, facing keyways open at the top and closed at the bottom.

9. In the access floor box of claim 7:

a rectangular-shaped cover in said access opening, the cover formed with:

a cover front wall, a cover back wall, and a pair of cover side walls connected together and formed into a rectangular shape, the top edges of the walls being coplanar;

a pair of pivot shafts respectively extending outwardly from opposite ends of said cover back wall to be received in pivot shaft receivers in a cover frame;

a central support section connected to the bottom of said cover front, cover back, and cover side walls, and extending downwardly therefrom, the central support section having a plurality of interconnected flanges forming a strengthening grid; and said cover front wall being formed with an opening to pass electrical cables and to receive cable management, each of said cover side walls being formed with an opening to pass electrical cables and to receive a cable management block.

10. In the access floor box of claim 5:

a rectangular-shaped cover frame in said rectangular-shaped opening, the cover frame formed with:

a frame front wall, a frame back wall, and frame side walls forming an access opening to said chamber and the top of each last said wall being formed with said outwardly extending flange means;

snap latch means connected with said frame front wall for engaging said front wall latch keeper means;

locking finger means on said frame back wall for engaging said finger keeper means; and at the end of each side wall adjacent the back wall a U-shaped pivot shaft carrier, each for receiving a pivot shaft to rotatably mount a cover on the frame.

11. The access box of claim 10 further including:

means on said cover frame adjacent said front wall forming a pair of spaced apart, facing keyways open at the top and closed at the bottom.

12. In the access floor box of claim 10:

a rectangular-shaped cover in said access opening, the cover formed with:

a cover front wall, a cover back wall, and a pair of cover side walls connected together and formed into a rectangular shape, the top edges of the walls being coplanar;

a pair of pivot shafts respectively extending outwardly from opposite ends of said cover back wall to be received in pivot shaft receivers in a cover frame;

a central support section connected to the bottom of said cover front, cover back, and cover side walls, and extending downwardly therefrom, the central support section having a plurality of interconnected flanges forming a strengthening grid; and said cover front wall being formed with an opening to pass power, communication, and data cables and to receive cable management block.

13. The access floor box of claim 1 further including on said front wall a plurality of access holes for use in receiving the shank of a screwdriver for use in attaching electrical plates.

14. In an access floor box:

wall means forming a chamber having a top opening;

means connected with the box for engaging the edge of a floor opening in an access floor to support the box on the access floor;

spaced apart plate means in the box, the opposite ends of which are connected to said wall means and he plate means forming a channel open to said chamber; and openings in the wall means providing communication with the exterior of the box and said channel, last said openings and the channel forming a passageway for cable to be fed through the box and/or to be joined to connector means in the channel.

15. In an access floor box:

wall means forming a chamber having a top opening;

means connected with the box for engaging the edge of an opening in an access floor to support the box on the floor;

spaced apart means in the box connected to said wall means, the spaced apart means forming a channel open to said chamber;

openings in the wall means providing communication between exterior of the box and said channel, last said openings and said channel forming a passageway for cable to be fed through the box and/or to be joined to connector means in the channel.

16. For an access floor box, a housing formed with:

a flat back wall having a top edge and a bottom edge;

a front wall having a top edge and a bottom edge and an outwardly extending flange at the top edge;

the front wall arcuately converging in a direction from its top edge to its bottom edge in a direction toward the back wall;

a pair of flat side walls each having an upper section and a lower section with the upper sections being connected to said front and back walls and with each lower section extending outwardly from the bottom edge of the back wall and each upper section having an outwardly extending flange coplanar with first said flanges;

the flanges on said front wall and on said upper sections being for use in engaging the edge of an opening in an access floor to support the box in the floor;

a flat back foot connected to the bottom edge of the back wall and extending outwardly therefrom and connected to the respective top edges of the lower sections of the side walls which extend outwardly from the back wall;

said front, back, and side walls forming a generally rectangular-shaped chamber with the respective top edges forming an opening to the chamber;

a pair of spaced apart barriers extending parallel to said side walls and each connected to said back foot and to the bottom edge of said front wall; and the space between said barriers forming a power channel, the space between one of the barriers and one side wall forming a first communication channel, and the other barrier and the other side wall forming a second communication channel.

17. For an access floor box, a housing formed with:

back wall means having a top edge and a bottom edge;

front wall means having a top edge and a bottom edge and an outwardly extending flange at the top edge;

the front wall means arcuately extending from its top edge in a direction toward its bottom edge;

a pair of flat side wall means, each having an upper section and a lower section with the upper sections being connected to said front and back wall means and with each lower section extending outwardly from the bottom edge of the back wall means and each upper section having an outwardly extending flange coplanar with first said flange;

the flanges on said front wall means and on said upper sections being for use in engaging the edge of floor opening in an access floor to support the box in the floor;

back foot means connected to the bottom edge of the back wall means and extending outwardly therefrom and connected to the respective top edges of the lower sections of the side wall means which extend outwardly from the back wall means;

said front, back, and side wall means forming a generally rectangular-shaped chamber with the respective top edges forming a rectangular opening to the chamber; and barrier means extending parallel said side wall means and connected to said back foot means and to the bottom edge of said front wall means, the barrier means forming channel means for the passage of cable.

18. In an access floor box:

a back wall having a top edge and a bottom edge;

a front wall;

the front wall having an upper portion with a top edge and a lower portion with a bottom edge, the upper portion arcuately converging from its top edge in a direction toward its bottom edge;

a pair of side walls each having an upper section and a lower section with the upper sections being connected to said front and back walls and with each lower section extending outwardly from the bottom edge of the back wall;

said front, back, and side walls forming a chamber with said respective top edges forming a rectangular shape opening to the chamber;

means connected with the box for engaging the edge of a floor opening in an access floor to support the box in a floor;

said lower portion of the front wall comprising a front plate, a back plate, and a mounting plate, the front and back plates being spaced apart and forming a channel with a top opening and a bottom opening, the top opening being open to said chamber and the bottom opening being open to the exterior of the box and the mounting plate being disposed between the back plate and the bottom edge of the front wall; and the lower portions of the side walls each having a side opening in communication with said channel, the side openings and the channel providing a passageway for cable to be fed through the box.

19. The floor box of claim 18 wherein said mounting plate has a plurality of connector openings for use in receiving electrical connectors.

20. The floor box of claim 18 further including plate means extending across the top opening of said channel for use in mounting electrical connectors.

21. The floor box of claim 20 wherein said plate means has a pair of spaced apart barriers extending into said channel.

22. The floor box of claim 18 further including cover means extending across the bottom opening of said channel to at least in part close off communication between the channel and the exterior of the box.

23. An improved access floor box for mounting within a precut opening in an access floor having an upper surface and a space therebelow, for conveying communications and data cables to a work station disposed on and above the access floor, and for providing recessed receptacles to receive plugs from the work station, comprising:

a connection housing having walls that define a connection chamber adapted to be disposed within the precut opening and that have top edges lying in a flat, common plane, with the top edges of the connection housing walls defining a cross-sectional connection opening that is congruent with and substantially the same size as the precut opening;

means for mounting the connection housing in the precut opening so as to position the connection housing within the precut opening and so that the flat common plane, defined by the top edges of the connection housing walls, is generally adjacent to the upper surface of the access floor;

means defining an activation channel that extends from the connection housing in a direction generally parallel to the access floor, that defines an activation chamber in communication with the connection chamber and with the space below the access floor, the activation channel sized to be inserted through the precut opening in the access floor; and a generally flat cover for the connection opening, the cover having edges that are disposed adjacent to and closely conforming to the top edges of the connection housing walls so that the cover may be disposed within the connection opening and also having a cable opening therein so as to allow cables to enter the connection housing and extend into the connection chamber while the cover is positioned adjacent to top edges of the connection housing walls whereby the improved access floor box is constructed so as to be inserted and removed through the precut opening in the access floor, to occupy a shallow part of the space below the access floor, and to accept activation cables through the activation channel.

24. The improved access floor box of claim 23 wherein outlet connector supports are mounted at least in part within the connection housing, generally adjacent to the connection chamber, and oriented to position the recessed power receptacles so that they face the connection chamber.

25. The improved access floor box of claim 24 wherein the activation channel includes barriers separating the activation chamber into a plurality of service chambers that communicate with the connection chamber and with a space below the access floor; and wherein the outlet connector supports are positioned at the end of the service chambers adjacent to the connection chamber whereby multiple types of service activations may be accommodated and separated by the floor box.

26. The improved access floor box of claim 25 wherein the cover is partially supported within the connection opening by a hinge mounted to a wall of the connection housing adjacent to the outlet connector supports whereby the cover may be opened to provide direct access to recessed power receptacles that may be mounted therein.

27. The improved access floor box of claim 26 wherein a wall of the connection housing opposite the wall mounting to the hinge converges arcuately toward the connection housing wall adjacent to the outlet connector supports.

28. The improved access floor box of claim 27 wherein the mounting means comprises a substantially continuous frame affixed to and extending outwardly from the top edges of the connection housing walls whereby the access floor box is supported by the frame engaging the upper surface of the access floor adjacent to the precut opening.

* * * * *